July 5, 1960 A. BOEKHORST ET AL 2,944,186

CIRCUIT ARRANGEMENT FOR PRODUCING
A SAWTOOTH CURRENT IN A COIL
Filed May 8, 1957

INVENTOR
ANTONIUS BOEKHORST &
HENDRIK HEIJLIGERS
BY
Frank R. Jifani
AGENT

United States Patent Office 2,944,186

Patented July 5, 1960

2,944,186

CIRCUIT ARRANGEMENT FOR PRODUCING A SAWTOOTH CURRENT IN A COIL

Antonius Boekhorst and Hendrik Heijligers, Eindhoven, Netherlands, assignors to North American Philips Company, Inc., New York, N.Y., a corporation of Delaware Filed May 8, 1957, Ser. No. 657,767

Claims priority, application Netherlands June 15, 1956

3 Claims. (Cl. 315—27)

Figure 1:
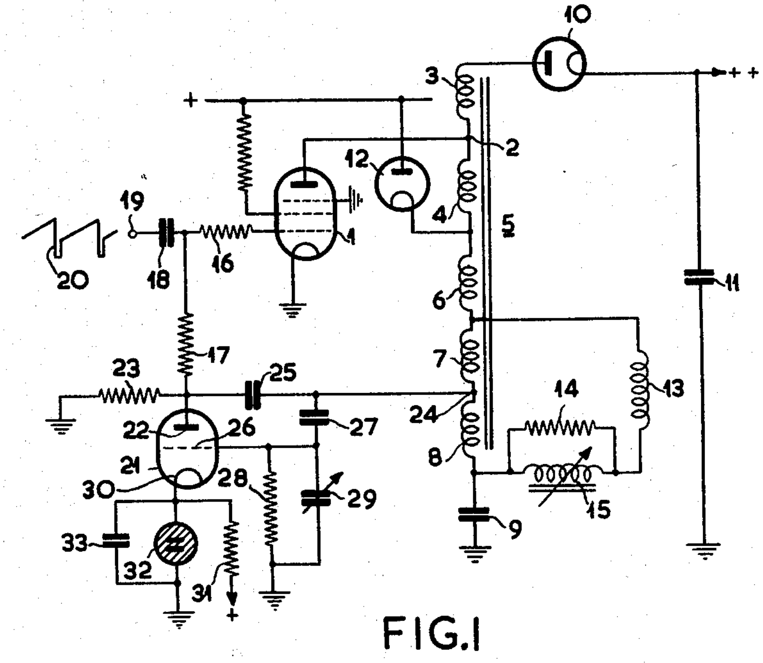

This invention relates to circuit arrangements for producing a sawtooth current in a coil by means of a tube, the control grid of which has applied to it a voltage periodically releasing the tube, the output circuit of the tube including the series-combination of a transformer winding to which the coil is coupled, and a capacitor forming part of a series booster-diode circuit coupled to the transformer, a direct voltage increasing the direct anode voltage of the tube being set up across said capacitor and a direct voltage being derived by rectification from the pulses which occur across the transformer during the fly-back of the saw-tooth current.

Such circuit arrangements are frequently used in television receivers for deflecting the cathode-ray of the picture tube in the line direction and for producing the high direct voltage required for the picture tube.

It is in this case important that the value of the direct voltage produced and the amplitude of the deflection current traversing the coil should be maintained substantially constant upon variation in supply voltage and upon variations in load which occur as a result of variation in current strength of the cathode-ray of the picture tube upon varying brightness of the picture to be reproduced. It is also frequently desirable that the direct voltage produced and the amplitude of the deflection current should remain constant if the television receiver is intended for the reception of television transmissions of different line frequencies. Another problem is to keep said magnitudes constant upon replacement or during aging of the tube or of the damping diode included in the series booster-diode circuit. If, as is common practice, the tube is of the pentode or beam-tetrode type, it is also important that the anode voltage of the tube should be stabilized at a value higher than the anode voltage of the tube corresponding to the knee of the anode current anode voltage characteristic in order to avoid the occurrence of "Barkhausen" oscillations.

Finally, the conventional circuit arrangements comprise means for controlling the amplitude of the deflection current, which are connected either in series with, or partly in series with and partly in parallel with the coil, which means occupy about 10% to 20% of the magnetic energy of the deflection circuit.

The object of the circuit arrangement according to the invention is to provide a solution of one or more of the above-mentioned problems and it is characterized in that the difference between a positive voltage derived from the said series-combination and a stabilization voltage is applied to an amplifying rectifier which is active only during the fly-back of the sawtooth current and that the negative output voltage of the rectifier is applied to the control grid of the tube, the amplitude of the sawtooth current traversing the coil being controlled only by controlling the amplitude of the positive voltage applied to the rectifier and derived from the said series-combination.

Figure 2:
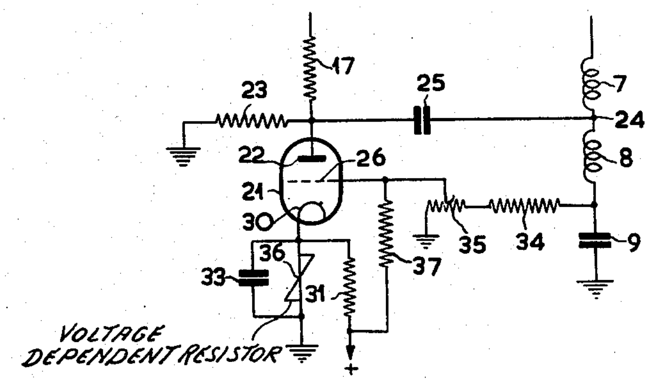

In order that the invention may be readily carried into effect, two embodiments will now be described more fully, by way of example, with reference to the accompanying drawing, in which:

Fig. 1 shows a first embodiment of the circuit arrangement according to the invention, and Fig. 2 shows part of the circuit arrangement of Fig. 1 which is modified in accordance with a second embodiment of the invention.

In the circuit arrangement shown in Fig. 1, the anode of a tube 1 is connected to common point 2 of windings 3 and 4 of a transformer 5, which also comprises windings 6, 7 and 8. A capacitor, one side of which is connected to earth, is connected in series with said windings. The winding 3 is connected, at one end, to the anode of a rectifier 10. A capacitor 11 is included between the cathode of said rectifier and earth. The common point of the windings 4 and 6 of transformer 5 is connected to the cathode of a rectifier 12, the anode of which is connected to the positive terminal of the source of supply. Connected parallel to the series-combination of the windings 7 and 8 is the series-combination of a deflection coil 13 and a network for linearizing the deflection current, which network comprises the parallel-combination of a resistor 14 and a slidable core coil 15.

The control grid of tube 1 has a voltage 20 applied to it via a series-resistor 16, a grid-leak resistor 17, a capacitor 18 and an input terminal 19, which voltage periodically releases the tube and in this example is shown of sawtooth form, but may alternatively be pulsatory.

The circuit arrangement so far described is of known type, that is to say that the circuit of the deflection coil 13 does not include a network for controlling the amplitude of the sawtooth current through the coil 13. As will appear hereinafter, such a network is superfluous when using the circuit arrangement according to the invention which will be described hereinafter.

As is well-known, a sawtooth current flows through the windings 4, 6, 7 and 8 and the deflection coil 13 during the time in which the tube 1 is conducting under the control of sawtooth voltage 20, a pulsatory voltage occurring across said windings and winding 3 when the current in tube 1 is interrupted during the fly-back, which voltage is rectified by the diode 10, so that a high direct voltage is set up across the capacitor 11 and the load, connected in parallel thereto, which is constituted by the picture tube (not shown). After the end of the fly-back period, the voltage across the transformer windings decreases and the diode 12 becomes conducting, so that a positive direct voltage is set up across the capacitor 9, increasing the direct anode voltage of tube 1.

According to the invention, the circuit arrangement shown in Fig. 1 comprises a further tube 21, which acts as an amplifying rectifier and the anode 22 of which is connected to the lower end of the grid-leak resistor 17 of tube 1, whilst a resistor 23 is connected between the anode 22 and earth. A capacitor 25 is included between the anode 22 and common point 24 of the transformer windings 7 and 8, whilst the control grid 26 of tube 21 is connected via a capacitor 27 to point 24. The parallel-combination of a resistor 28 and a variable capacitor 29 is included between a control grid 26 and earth. A cathode 30 of the tube 21 is connected via a resistor 31 to the direct supply voltage, the cathode lead of tube 21 including the parallel combination of a voltage-stabilizing tube, for example a neon tube 32, and a capacitor 33.

During the fly-back of the sawtooth current through the windings of transformer 5, a positive voltage pulse is produced at point 24, which is supplied via capacitor 25 to the anode and via a voltage divider constituted by the capacitors 27 and 29 to the control grid of tube 21. For the sake of clearness, it is to be noted that this voltage pulse may alternatively be derived from the transformer winding by means of an additional winding, one side of which, for example, is connected to earth and the other side of which is connected to the junction between the capacitors 25 and 27.

The tube 21 is normally cut off, since a blocking biassing potential is produced across the stabilization tube 32 included in the cathode circuit. Furthermore, the tube can be conducting only if the fly-back pulse from the point 24 is supplied to the anode and if the voltage pulse which simultaneously occurs at the control grid 26, is sufficiently large, so that the difference occurring in the control-grid circuit between the positive voltage pulse and the stabilization voltage produced across stabilization tube 32 is sufficient to exceed the cut-off point of the anode current-grid voltage characteristic of tube 21. The voltage difference occurring in the control-grid circuit is amplified and rectified in the anode circuit, so that a pulsatory voltage with a negative direct current component is set up at the anode 22 and applied to the control grid of tube 1. If the amplitude of the pulsatory voltage at point 24 varies as a result of, for example, variations in supply voltage or variations in load parallel to the capacitor 11, this variation is amplified and rectified by tube 21, the rectified voltage varying the current in tube 1 in a compensating sense.

It is to be noted that it is not necessary for the said stabilization voltage to be produced by means of a comparatively expensive discharge tube. This is alternatively possible by the use of a small incandescent lamp in bridge connection (for example a tail-light lamp). Furthermore, the influence of variations in the ambient temperature then becomes very small because of the high operating temperature.

If it is desired to vary the amplitude of the sawtooth current through the coil 13, the capacitive voltage division is varied by controlling the capacitor 29, resulting in variation in the amplitude of the pulsatory voltage applied to the control grid 26.

Another advantage of the circuit arrangement shown in Fig. 1 is that upon variation in line frequency in the reception of television transmissions according to a different television standard, whereby the frequency of the control voltage 20 varies, the amplitudes of the high tension produced and of the deflection current through the coil 13 automatically remain constant.

Fig. 2 shows only a modified portion of the circuit arrangement of Fig. 1, in which corresponding parts are indicated by the same reference numerals. As before, a pulsatory voltage is derived from common point 24 of the windings 7 and 8 and applied via capacitor 25 to the anode 22 of tube 21. However, part of the positive direct voltage set up across capacitor 9 is applied via a resistor 34 and a voltage divider 35 to the control grid 26. The stabilization voltage is now produced across a voltage-dependent resistor 36 included in the cathode circuit of tube 21. A voltage dependent resistor is made of such material that a variation in the voltage applied to the resistor causes a variation in current through it that is not proportional to the voltage variation. In other words, such resistors do not follow Ohm's law, and more specifically the resistance values of such resistors decrease when the voltage applied to them is increased. Consequently, in this circuit arrangement, the value of the voltage set up across capacitor 9 is stabilized instead of the amplitude of the fly-back pulses across the transformer windings. If the value of the stabilization voltage across resistor 36 would still be slightly dependent upon variations in the direct supply voltage, a resistor 37 is included between the direct voltage source and the control grid 26. In this case, the control-grid voltage of tube 21 is independent of direct voltage variations and the stabilization is as satisfactory as when use is made of a stabilization tube 32 as shown in Fig. 1.

In the circuit arrangement of Fig. 2 also, the amplitude of the deflection current is controlled by controlling, by means of potentiometer 35, the value of the positive voltage applied to the control grid 26.

What is claimed is:

1. A circuit for producing a sawtooth current in a coil, comprising an amplifier device having a control electrode and an output electrode, a source of signals connected to said control electrode to render said amplifier device periodically conductive, a capacitor, a transformer winding connected in series between said output electrode and said capacitor, whereby a pulsatory voltage is developed in said winding, means coupling said coil to said transformer winding, a normally cut-off rectifying amplifier device having a cathode, an input electrode and an output element, said input electrode and output element being coupled to said winding so that said last-named device is rendered periodically conductive by said pulsatory voltage, a source of stabilization voltage connected to said cathode whereby the output voltage of said rectifying amplifier device is the difference between said stabilization voltage and said pulsatory voltage which is applied to said rectifying amplifier device, and means connected to apply said output voltage of the rectifying amplifier device to said control electrode.

2. A circuit as claimed in claim 1, including a capacitor connected between said transformer winding and said output element, a capacitor network connected between said transformer winding and said input electrode, and a direct-current conductive means connected between said output element and said control electrode.

3. A circuit as claimed in claim 1, including a capacitor connected between said transformer winding and said output element, a direct-current conductive means connected between said transformer winding and said input electrode, and a direct-current conductive means connected between said output element and said control electrode.

References Cited in the file of this patent

UNITED STATES PATENTS

| | | |
|---|---|---|
| 2,697,798 | Schlesinger | Dec. 21, 1954 |
| 2,712,092 | Schwarz | June 28, 1955 |
| 2,728,875 | Kihn | Dec. 27, 1955 |